Feb. 3, 1970     S. J. GRISAFFE ET AL     3,493,415
METHOD OF MAKING A DIFFUSION BONDED REFRACTORY COATING
Filed Nov. 16, 1967
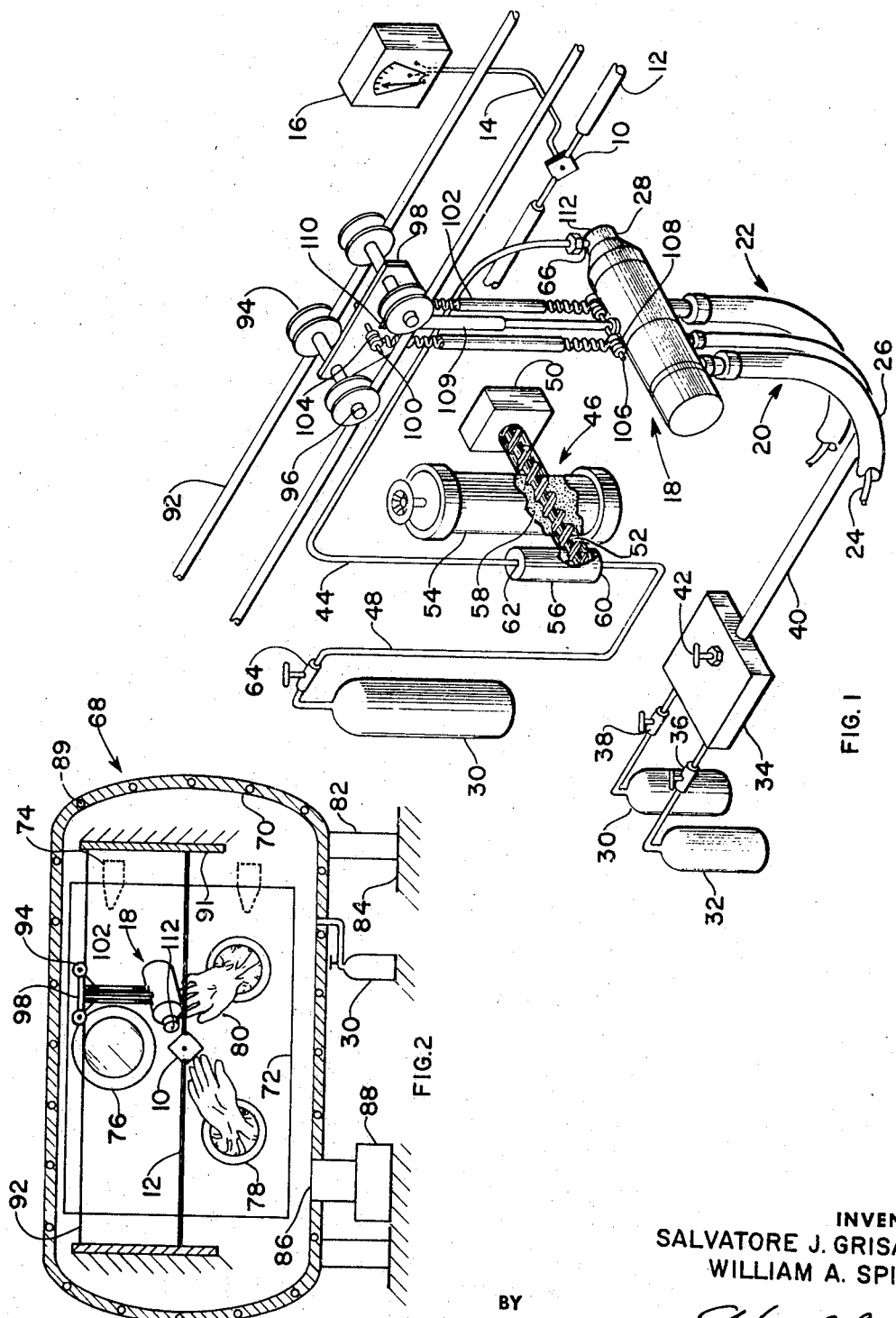
INVENTORS
SALVATORE J. GRISAFFE
WILLIAM A. SPITZIG
BY
*Q H McCoy*
*Norman T. Musial*
ATTORNEYS United States Patent Office 3,493,415
Patented Feb. 3, 1970

3,493,415
METHOD OF MAKING A DIFFUSION BONDED REFRACTORY COATING
Salvatore J. Grisaffe, North Olmsted, Ohio, and William A. Spitzig, Monroeville, Pa., assignors to the United States of America as represented by the Administrator of the National Aeronautics and Space Administration
Continuation-in-part of application Ser. No. 336,326, Jan. 7, 1964. This application Nov. 16, 1967, Ser. No. 683,613
Int. Cl. C23c *13/00*
U.S. Cl. 117—50                                                     2 Claims

ABSTRACT OF THE DISCLOSURE

A method for forming a diffusion bonded coating on a substrate. A substrate to be coated is cleaned and polished. The substrate to be coated is then heated to between ¼ and ⅘ of its melt temperature by the plasma from a metal spraying gun in a chamber which has been back-filled with an inert gas. Powdered metal or ceramic is then fed to the plasma and sprayed onto the heated substrate.

---

This application is a continuation-in-part of copending application Ser. No. 336,326 filed Jan. 7, 1964, now abandoned.

The invention described herein was made by employees of the United States Government and may be manufactured and used by or for the Government for governmental purposes without the payment of any royalties thereon or therefor.

The invention relates generally to refractory coatings and, more particularly, to a method and apparatus for forming an instantaneous diffusion bonded plasma spray coating.

In rocket and missile applications where high reliability is desirable, it becomes necessary for component parts, such as rocket nozzles, to have errosion barriers to insure long-term reliability. These errosion barriers are usually a coating made of a ceramic or refractory material. Further, rocket combustion chambers, because of the high temperatures of combustion, need various types of coatings contained thereon. Additionally, such coatings are necessary for edge coatings for tungsten-uranium fuel elements for nuclear rocket engines. In nonaerospace application it is desirable to have refractory coatings on automobile component parts which coatings have high wear resistance, are capable of withstanding a high temperature during operation, and are relatively inexpensive to apply.

Where refractory or ceramic coatings are applied to a surface or substrate, it is necessary to roughen the substrate, apply the refractory or ceramic powder thereon and, subsequently, perform a sintering treatment to form a strong mechanical bond between the roughened substrate and the powder. Where a coating is applied on such a roughened surface, the physical properties of the surface such as thermal conductivity, coefficient of thermal expansion, relative melting temperature, etc., will vary undesirably over the coated surface. Consequently, it is desirable to eliminate these variables for good engineering design of component parts for rocket engines. Further, even where the surface is roughened to establish a good base for a mechanically bonded coating, completely satisfactory refractory coatings cannot be obtained with substrates of the lesser refractory materials or with other materials such as stainless steel. Still further, where it is necessary to have the refractory coating act as a heat barrier, large thicknesses of the coating are required which cannot satisfactorily be obtained with current state-of-the-art methods.

Accordingly, an object of the invention is to provide for an apparatus to form an instantaneous diffusion bonded plasma spray coating.

Another object of the invention is to provide for a method for forming an instantaneous diffusion bonded plasma spray coating on various polished substrates. With this method, some of the coating material diffuses into the substrate and there is no reliance on mechanical bonding. Further, there is no undesirable melting of the coating and substrate to form an intermediate layer of substantial thickness as occurs when objects are welded together. Such an intemediate layer may have undesirable characteristics not found in the coating or the substrate.

A further object of the invention is the production of articles with surfaces of a diffusion bonded plasma spray coating.

Still, another object of the invention is to provide a metallic coating capable of withstanding temperature to and beyond 3000° F.

Briefly, these and other objects of the invention are attained by removing foreign materials from the surface upon which the coating is to be applied, polishing the surface to improve the surface finish by removing roughness therefrom, and placing the surface in a nonoxidizing environment having contained therein a plasma spray gun. The distance between the plasma spray gun and the surface to be coated can be adjusted. The surface is then preheated by the plasma spray gases. When the measured temperature of the surface reaches an experimentally predetermined preheat temperature which is considerably above those used in the prior art to prewarm surfaces to drive off surface moisture, the refractory coating material is fed into the plasma spray gun and a plasma spray is deposited on the substrate at the preheat temperature. After the coating is deposited upon the surface, the surface is allowed to cool to room temperature.

The apparatus in which the aforesaid objects are attained is a vacuum chamber with an inert gas supply for inserting therein an inert gas. In the vacuum chamber there is contained a plasma spray gun capable of being positioned on a guide rod which in effect allows for positioning the gun with respect to the surface to be coated therein. In order to inert the chamber, the chamber is first evacuated. Subsequently, it is purged with an inert gas such as argon or nitrogen before the substrate is preheated.

A more complete appreciation of the invention and many of the attendant advantages thereof will be readily apparent as the same becomes better understood by reference to the following detailed description when considered in conjunction with the accompanying drawings wherein:

FIG. 1 is an isometric view of some of the attendant features of the invention with the surface to be coated.

FIG. 2 is a fragmentary front view of the apparatus constructed in accordance with the invention.

Referring now to the drawings wherein like reference characters designate identical or corresponding parts throughout the several views, and, more particularly, to FIG. 1 thereof wherein embodiments of the present invention are shown as consisting essentially of a surface or substrate 10 which is to be coated with a refractory material and is supported by a supporting means 12. Attached to the substrate 10 is a thermocouple 14 which is used to measure the temperature of the substrate. The thermocouple 14 is connected to a potentiometer 16 which records the temperature.

Opposite and perpendicular to the substrate 10 there is positioned a conventional plasma spray gun 18. Connected to the plasma spray gun 18 are electrical leads 20 and 22. The electrical leads 20 and 22 consist of tubing 24 surrounded by electrical insulation 26. The tubing 24 can be made of copper. The tubing 24 acts as an electrical conductor carrying electrical current to the plasma gun 18 which ionizes and heats the plasma gas at the gun muzzle 28. Water which maintains constant temperature in the leads is passed through lead 20 to cool the gun 18 and outlets through lead 22 via the tube 24. The plasma spray gas is obtained by mixing an inert gas from a supply 30 with hydrogen or a similar gas from a supply 32 in a mixing manifold 34. The inert gas can be nitrogen, argon, or helium. The amount of inert gas and hydrogen flowing to the manifold 34 are controlled by control valve 36 and 38, respectively. The total amount of plasma gas flowing to the gun 18 through tube 40 is regulated by control valve 42 integral with the mixing manifold 34. At the muzzle 28 of the plasma spray gun 18 there is attached a tube 44, the other end of the tube 44 is connected to a powder generator 46. The powder generator 46 is connected to inert gas supply 30 through tube 48.

The powder generator 46 comprises an electric motor 50 connected to a spiral shaft 52. The spiral shaft protrudes through a container 54 and a chamber 56. In the container 54 there resides a refractory material 58 which makes up the instantaneous bonded coating on the substrate 10. The tube 48 from the inert gas supply 30 is connected to the bottom 60 of the chamber 56. The tube 44 is connected to the upper portion 62 of the chamber 56.

In operation the refractory powder material 58 in the chamber 54 is sent to the muzzle 28 of plasma spray gun 18 through tube 44 by turning the spiral shaft 52 connected to the electric motor 50 forcing the refractory powder material 58 in a longitudinal direction into the chamber 56. Inert gas, such as nitrogen, argon, or helium, flowing from the inert gas supply 30 and controlled by control valve 64 is sent to the chamber 56 mixing with the refractory powder material 58 forming a powder-gas mixture which flows through tube 44 to the inlet 66 of the muzzle 28 of the gun 18. When the refractory powder-gas mixture flows into the muzzle of spray gun 18 it combines with the hot plasma gas, which is heated inside the gun by flowing through a continuous arc, forming a high velocity plasma spray. The plasma spray can exist from the plasma spray gun at temperature exceeding 3000° F. The temperature is controlled by regulating the current through the leads 20 and 22 to the plasma spray gun 18.

Referring now to FIG. 2 whereon there is shown a fragmentary view of the apparatus constructed in accordance with the present invention, the plasma spray gun 18 and the specimen 10 are contained in a chamber 68 having a wall 70. The chamber consists of a door 72 fastened to the wall 70 by hinges 74. The door 72 forms an airtight seal with the wall 70 and has a viewing port 76 and a pair of glove ports 78 having attached thereto a pair of gastight heat resistant gloves 80. The chamber 68 is supported by supports 82 on floor 84. Attached to the chamber 68 through an opening 86 is a vacuum pump 88, additionally, the inert supply 30 is attached to the chamber 68 at opening 90. Within the chamber wall 70 there is contained a plurality of cooling coils 89 through which a cooling fluid is passed. Attached to the wall 70 of the chamber 68 at location 91 are a pair of rods or rails 92. These rails are fastened by adjusting screws (not shown in FIG. 2) which hold them on the wall by exerting a friction force thereon. Supported by these rails are four pulley type wheels 94. The holder 12 which supports the substrate 10 is fastened to wall 70 at location 91 in the same manner as the rails 92.

Referring again to FIG. 1, the four pulley type wheels 94 are fastened to and free to rotate on a pair of axles 96. Attached to the axles 96 and centerized with respect to the wheels 94 is a plate 98. In the center of the plate 98 there is contained a first rod 100, the rod being threaded at each end. Fastened to each end of the rod are a pair of springs 102 held in place by two pairs of fastening nuts 104. On the opposite ends of the springs 102 there is attached a second rod 106 which has each end thereof threaded, and upon the threaded ends are fastened the springs 102, held in place by a second pair of fastening nuts 108.

Integrally attached and perpendicular to the center of the second rod 106 is a guide rod 109. The guide rod 109 has on its upper end 110 a slot extending over a portion of the length of the rod 109 wherein the plate 98 is inserted whereby the plasma spray gun 18 can be moved in a vertical direction with respect to the plate 98 and when not so moved, held rigidly in place by the springs 102 and the guide rod 109. By moving the spray gun 18 in a vertical direction along the slot in guide rod 109, the substrate 10 is traversed in a vertical direction. Further, by rolling the wheels 94 over the rails 92, the plasma spray gun 18 will traverse the substrate 10 along the horizontal direction which allows for coating the surface area of the substrate using the plasma spray gun.

In assembling, the rails 92 are fastened to the wall 70. The wheels 94 with the plasma spray gun 18 attached thereto as aforedescribed are placed upon the rails 92. The support 12 with the substrate 10 attached thereto is fastened to the wall 70 of the chamber 68 thereby fixing the distance between the muzzle exit 112 and the substrate 10. The door 72 to the chamber 68 is then closed forming a gastight enclosure.

The electrical supply, powder generator 46, and gas supplies 30 and 32 are placed outside of the chamber 68 with the appropriate vacuum attachments to the chamber (not shown) which attach to the plasma spray gun 18 as shown in FIG. 1.

The method of the present invention consists of cleaning the substrate 10 upon which the refractory coating is to be applied. The surface is prepared by rinsing it with acetone or another solvent to remove grease, oil, and other foreign material. Subsequently, the surface is polished with moist levigated alumina or other similar grinding compounds with a soft polishing cloth. Polishing continues until the surface is extremely clean and smooth.

After polishing the surface to the desired smoothness, the surface is thoroughly rinsed with tap water followed by distilled water. The rinsing process can also be accomplished with alcohol or another similar type of fluid.

After cleaning, the substrate is then placed in the support 12 which is positioned to the desired distance with respect to the muzle exit 112 in the chamber 68. The chamber 68 is then closed as heretofore described. An electrical potential is then placed across the electrical leads 20 and 22 causing a current to flow through the plasma spray gun 18. The inert gas and hydrogen are sent to the mixing manifold 34 wherein they are combined and sent through tube 40 to the plasma spray gun 18. In the gun, the gas is heated by an electric arc to temperatures which are a function of the electric potential across the electrical leads 20 and 22. This potential can be adjusted by means of a variable transformer (not shown in FIG. 1 or 2). The hot gas leaves the gun 18 at the muzzle exit 112 impinging on the substrate 10 and heating the substrate to an experimentally determined preheat temperature. The substrate temperature is measured by the thermocouple 14 and recorded on the potentiometer 16. When the substrate temperature reaches that temperature of the impinging gas, the electric motor 50 is turned on and the inert gas from source 30 is allowed to flow through the powder generator 46 causing the powder material 58 contained therein, which is a refractory or other type of material to be used as a coating, to flow through tube 44, enter the muzzle 28 of plasma spray gun 18 at 66, mix with the hot plasma gas coming through the nozzle 28 forming the plasma spray which then exits through the muzzle exit 112 and impinges upon the preheated substrate thereby forming an instantaneous diffusion bonded plasma spray coating.

Refractory materials which can be used with the aforesaid method of the instant invention are tungsten, tantalum, columbium, and molybdenum. The substrate material can be any of the aforesaid materials or any ceramic, cermet or high alloy of steel.

The following examples, described in greater detail, are the instantaneous diffusion bonded plasma spray coatings and the procedure for applying them to a substrate. In all of the examples hereinbelow discussed a plasma spray gun operating in the aforesaid described chamber was utilized under the following fixed conditions:

Muzzle 28 diameter—7/32 internal inch internal diameter;
Current through leads 20 and 22—450 amperes;
Potential across leads 20 and 22—6 volts;
Plasma gas:
 Flow of inert gas—80 cubic feet/hour;
 Flow of hydrogen—10 cubic feet/hour;
Flow of inert gas through powder generator 46—10 cubic feet/hour;
Particle size used for the refractory powder 58 contained in the powder generator 46 was from 74–30 microns; and
Substrate 10 used for these examples was 1×1×0.017 inch.

In each example hereinbelow, each specimen had a Pt-Pt-13%-Rh thermocouple spot welded to the back face thereof and the temperature was monitored by a recorder with a response of a few milliseconds.

It is to be noted that although hydrogen was mixed with the inert gas in the following examples, it is possible to omit the use of hydrogen in the present invention. However, the use of hydrogen results in a more stable and better controlled temperature of the plasma gas mixing with the refractory powder 58 in the muzzle 28.

EXAMPLE 1

Tungsten coating on a tungsten substrate

The distance between the plasma spray gun muzzle exit 112 and the tungsten substrate 10 was adjusted to four (4) inches. The chamber 68 was then sealed as heretofore described. The chamber was then evacuated by vacuum pump 88 to a pressure of approximately 20 microns of mercury. Nitrogen was allowed to pass into the chamber from inert gas source 30 through inlet means 90 inerting the chamber 68. Cooling water was allowed to flow through the cooling coils 89 to lower the temperature of the chamber walls 70 during operation of the plasma spray gun 18. The plasma spray gun was activated whereby hot plasma gas was exhausted from the gun at a temperature of approximately 2750° F. The temperature of the substrate 10 which was heated by the impinging plasma gas was approximately 2650° F. The temperature of the substrate reached equilibrium in approximately two (2) to three (3) seconds. When a temperature equilibrium was reached the tungsten powder 58 in the powder generator 46 was activated for approximately one (1) second flowing into the muzzle 28 and mixing with the hot gases forming the plasma spray in the muzzle 28 and exhausting from the exit 112. The plasma spray impinges on the substrate 10 at a temperature of 2750° F. to form an instantaneous diffusion bonded coating on the tungsten substrate. The gun 18 was rolled out of position along the rails 92 and was subsequently shut off. The substrate 10 was then allowed to cool to room temperature and the door 72 of the chamber 68 was opened. The total time involved for substrate preheating, spraying, and cooling down to 400° F. was approximately 30 seconds. Average velocity for the plasma spray was between 215 to 240 feet/second.

The procedure outlined in the aforesaid example was repeated for muzzle to substrate distances for 5, 6, and 7 inches at temperatures of approximately 2400, 2150, and 2050° F., respectively. At the aforesaid temperatures the same diffusion bonded coating was achieved as shown in FIG. 3.

From the foregoing, it will be seen that a coating of tungsten was diffusion bonded to a tungsten substrate at muzzle to substrate distances ranging from 4 to 7 inches and substrate temperatures ranging from 2050° F. to 2650° F. Since the melting point of tungsten is 6150° F., it will be seen that the temperatures employed were in the range ⅓ to ⅖ of the melting temperature of the substrate.

With regard to minimum temperature, satisfactory diffusion bonding is achieved with a substrate temperature as low as about 1700° F. The maximum allowable substrate temperature is slightly below the substrate melting temperature to prevent formation of an undesirable intermediate layer more than 1 or 2 microns thick. In general, a substrate temperature of from ¼ to ⅘ of the melting temperature of the substrate is satisfactory to produce a diffusion bond.

EXAMPLE 2

Tungsten on molybdenum substrates

The method described in detail in Example 1 was used to apply tungsten on a molybdenum substrate. In the instant example, however, the muzzle exit to substrate distance was 2 inches and the preheat temperature was approximately 3700° F. When the molybdenum substrate reached equillibrium of 3700° F., the tungsten powder in the powder generator 46 was activated as heretofore described forming a plasma spray at the gun exit. The plasma spray was deposited on the molybdenum at a temperature of approximately 3700° F. and instantaneously formed a metallurgical bond. The gun then was moved out of position as previously described and the specimen allowed to cool down.

The aforedescribed procedure was followed for the tungsten-molybdenum combination at distances of 3, 4, 5, and 7 inches, and at temperatures of approximately 2900, 2400, 2250, and 1750° F. In all the above distance-temperature combinations, namely 2 to 7 inchtes and 1750° F. to 3700° F., an instantaneous diffusion bonded coating was achieved on the molybdenum substrate. As for the tungsten-tungsten combination a true metallurgical bond and complete continuity of grain structure between the plasma-sprayed tungsten and the hot-molybdenum substrate was achieved, indicating that the method of the instant invention is not only applicable to like materials but also to dissimilar metal systems.

Using the method of the instant invention described in detail in Example 1, and varying the torch distance up to 7 inches and temperature between about 3700° F. and about 1700° F. an instantaneous diffusion bonded coating can be achieved with other material substrate combinations. In addition to tungsten, tantalum and molybdenum can be used as a refractory coating on high alloy steels, ceramics, cermets and other types of refractory materials. Utilizing the method of the instant invention, tungsten has been diffusion bonded to stainless steel and both alumina and zirconia have been diffusion bonded to themselves and each other. In applying these materials to the substrates made out of the aforementioned types of materials it is first necessary to determine the melting point of the material, select a torch-to-substrate distance, and preheat the substrate to a temperature between ¼ and ⅘ of its melting temperature. The substrate may be heated up to slightly below its melting point as an upper limit, so there is no substantial softening of the substrate, but preferably not below 1700° F. as a lower limit. As in Examples 1 and 2 the procedure should be carried out in an inerted atmosphere wherein the environment is initially evacuated to approximately a pressure of 20 microns of mercury and, subsequently, an inert gas is introduced which in the case of the aforedescribed examples was nitrogen but can be argon or helium.

In an embodiment using the method of the present invention, an instantaneous bonded diffusion coating can be formed on the contacting surface of rotating machinery, rocket nozzles, and bearing and journal surfaces.

A further embodiment using the method of the present invention can be the formation of an intermediate film between two heat transfer surfaces where the contact of the surfaces is not on the asperities of the original surface but rather, the contact is over the entire area as defined by the coating.

What is claimed is:
1. A method of forming a refractory coating on a substrate comprising the steps of cleaning the substrate to remove foreign materials, polishing the substrate to remove roughness to prevent mechanical interlocking of the substrate and the coating, heating said substrate in an inert gas atmosphere to a preheat temperature of about ⅘ of its Fahrenheit melting temperature with a plasma flame from a plasma spray gun having a nozzle, the upper limit of said preheat temperature being sufficiently less than the substrate melting temperature to prevent substantial alloying of the coating and the substrate, said plasma including an inert gas, and supplying a refractory material to the nozzle of said plasma spray gun whereby a refractory coating is sprayed on the substrate and is instantaneously diffusion bonded thereto.

2. The method of claim 1 in which the refractory material supplied to the nozzle of the plasma spray gun is selected from the group consisting of alumina, tungsten, tantalum, columbium, molybdenum, and zirconia.

References Cited

UNITED STATES PATENTS

| | | |
|---|---|---|
| 2,431,684 | 12/1947 | Brophy _____ 118—326 X |
| 2,561,982 | 7/1951 | Hanna et al. _____ 118—620 X |
| 2,588,421 | 3/1952 | Shepard. |
| 2,728,322 | 12/1955 | Szczepanski _____ 118—326 |
| 3,010,009 | 11/1961 | Ducati. |
| 3,033,705 | 5/1962 | Hanink et al. _____ 117—50 |
| 3,100,724 | 8/1963 | Rocheville _____ 118—326 X |
| 3,179,783 | 4/1965 | Johnson _____ 219—76 |

FOREIGN PATENTS

| | | |
|---|---|---|
| 562,322 | 8/1958 | Canada. |
| 345,653 | 3/1922 | Germany. |

OTHER REFERENCES

Ingham: "Flame Sprayed Protective Coatings" from Materials Protection vol. I, No. 1, pp. 74–78, January 1962.

ALFRED L. LEAVITT, Primary Examiner

J. H. NEWSOME, Assistant Examiner

U.S. Cl. X.R.

117—53, 93.1; 219—76